UNITED STATES PATENT OFFICE.

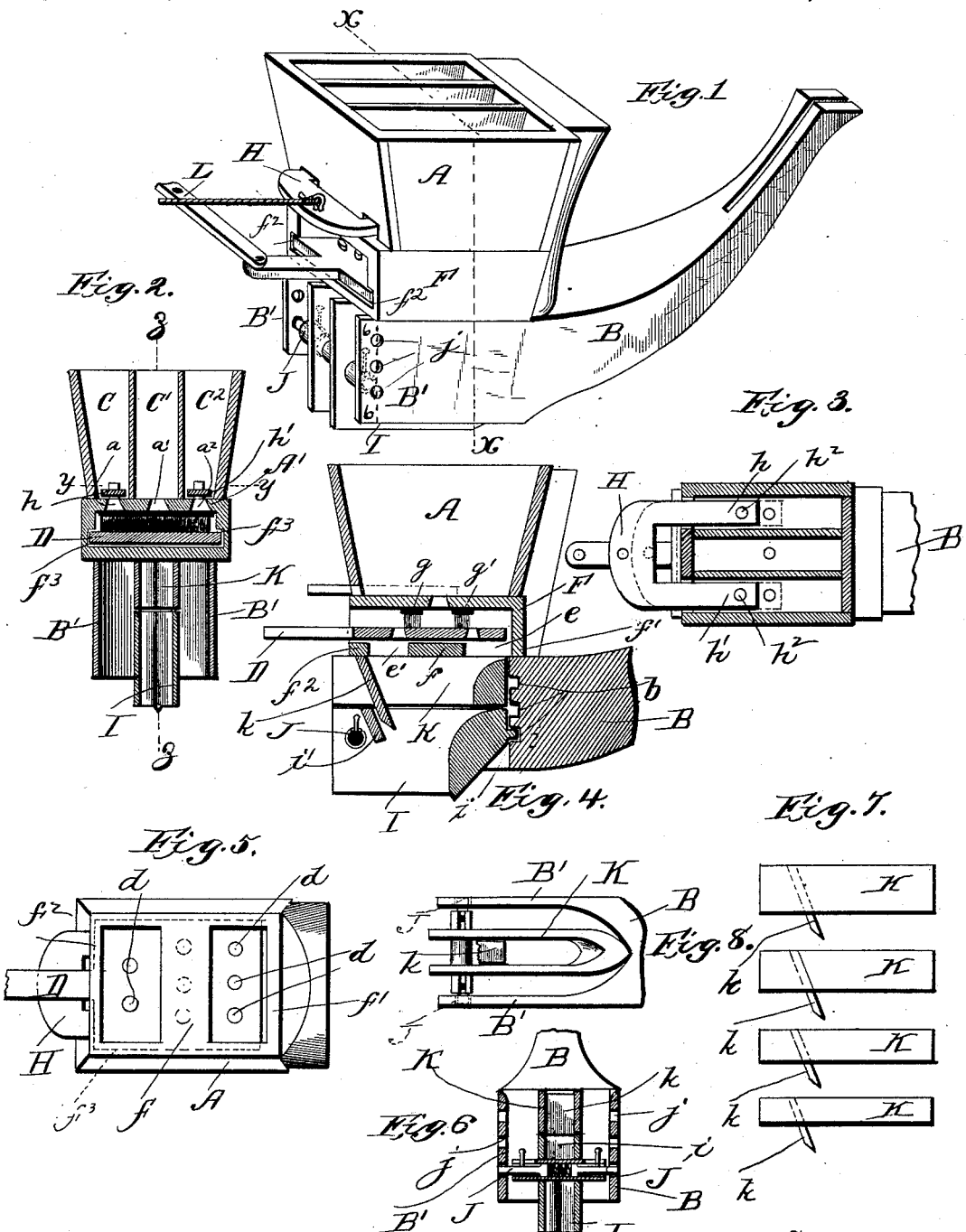

SETH BEAL, OF MANCHESTER, IOWA.

PLANTER.

SPECIFICATION forming part of Letters Patent No. 359,005, dated March 8, 1887.

Application filed January 8, 1887. Serial No. 223,780. (No model.)

*To all whom it may concern:*

Be it known that I, SETH BEAL, a citizen of the United States, residing at Manchester, in the county of Delaware and State of Iowa, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to combined planters and fertilizer-distributers.

The improvement consists in the novel features more fully hereinafter set forth, claimed, and shown in the annexed drawings, in which—

Figure 1 is a perspective view of a hopper and runner embodying my improvement. Fig. 2 is a transverse sectional view on the line X X of Fig. 1. Fig. 3 is a sectional view on the line Y Y of Fig. 2. Fig. 4 is a sectional view on the line Z Z of Fig. 2. Fig. 5 is a bottom view of the hopper detached from the runner. Fig. 6 is a sectional view of the runner on the line 6 6 of Fig. 1, on an enlarged scale. Fig. 7 shows detail views of the interchangeable pieces for filling the space between the bottom of the hopper and the top of the inner runner.

The object of the invention is the improvement of the hopper and the runner, whereby grain and fertilizer can be planted together or singly, and in one or different furrows at any desired level. Inasmuch as the novelty resides in the hopper and runner, it has been deemed necessary to show such parts only, together with the improvements.

The hopper A, divided into a number of compartments, preferably three, is supported upon the runner B, and the bottom A' has openings $a\ a'\ a^2$ formed therethrough, which communicate with the several compartments, C C' C$^2$, of the hopper. The openings $a\ a'\ a^2$ register with corresponding openings in the slide D, which works in suitable guides between the bottom of the hopper and the top of the runner. The slide is limited in its movements by the stops or set-screws which extend into the space $e$, formed between the central and end bars, $f$ and $f'$, of the frame. A corresponding space, $e'$, is formed on the opposite side of the central bar, between it and the end bar, $f$, of the frame F. The frame has side flanges, $f^3$, between which the slide D works and is guided in its movements thereby. The frame F and bottom A' may be separate or integral, as desired, and the central bar, $f$, of the frame is located directly beneath the openings through the bottom and the brushes $g$ and $g'$, which project downwardly from the bottom in line with the opposite sides thereof for holding the grain and fertilizer in place upon the slide while the openings therein pass under the brushes and over the openings $e$ and $e'$, where it is discharged.

The middle compartment, C', of the hopper is principally designed for grain, and the adjacent compartments C and C$^2$ for fertilizers. However, the order may be reversed. The grain may be supplied to the end and the fertilizer to the middle compartments, or grain and fertilizers may be used alone. The end compartments, C and C$^2$, are provided with cut-offs $h$ and $h'$, united at their outer ends by the yoke H. The stops $h^2$ limit the outward movement of the cut-offs. The cut-offs are for the purpose of shutting off the supply or feed of one or both of the compartments C and C$^2$, as desired.

The runner B has a vertical recess in its heel, over which the hopper A is located, formed between the sides B', between which the supplemental runner I is adjustably secured by having its front end provided with a projection, $i$, which is adapted to enter one of a series of openings, $b$, in the front wall of the runner B, and its rear end adjustably connected with the sides B', near their rear ends, by the pin or spring-catches J, which are adapted to enter one of a series of sockets or openings, $j$, formed vertically in the sides B', near their ends. When the runner I is adjusted to regulate the depth of earth between the grain and the fertilizers, the space between its top and the bottom of the hopper varies, and, as it is objectionable to have such space, interchangeable pieces K are provided, which fill such space, forming a continuous spout or chute for the grain from the hopper to the ground. The interchangeable runner and the filling-pieces are of a less width than the space between the sides B' of the runner B, so as to have a space on each side thereof for the fertilizers to pass from the hopper to the ground. A vertical recess extends inward for a portion of the length of the runner I and the filling-pieces K, and forms a passage-way for the grain. A plate, i', closes the space in the runner I and inclines forward to deflect the grain into the furrow. A corresponding deflector, k, is located in the space in the filling-pieces K, and its lower end projects below the bottom thereof and enters the space in the runner I, thereby holding the filling-piece from accidental displacement. The wall between the sides B' B' of the runner curves outwardly from a medial line in opposite directions, and the end of the runner I and the filling-pieces correspondingly curve, so that when the pieces are in place there can be no lateral displacement.

In practice, suppose grain is fed into the compartment C' and fertilizers into the compartments C and C² of the hopper. Motion is communicated from any suitable part of the machine to the seed-slide D by the lever L, and the grain and fertilizers will be simultaneously liberated and escape to the ground, the grain passing through the filling-piece and the supplemental runner and the fertilizers on each side thereof. The grain is planted at a lower level than the fertilizers, equal to the distance between the bottom of the supplemental runner and the main runner, and by reason of the peculiar construction of the two runners a layer of earth falls between the seed and fertilizers and prevents the grain and fertilizers being planted in the same furrow and the consequent burning of the grain.

Of course it will be understood that the supplemental runner can be adjusted to plant the grain above the fertilizers, if so desired; but this will seldom happen; hence it is not deemed of sufficient moment to enter into a detailed description thereof.

When the ground is sufficiently rich or has been previously supplied with fertilizer, the supply of fertilizer from the hopper can be readily shut off by pushing in the cut-off h h'. The supplemental runner and the filling-pieces are for keeping the grain and fertilizers separate, and by removing them the grain and fertilizers can be planted in the same furrow. The openings in the slide flare outwardly and downwardly, to prevent the grain choking therein.

The front end of the supplemental runner may be adjustably connected in any suitable way with the main runner other than that shown. For instance, instead of the projection i and the openings b, hooks and eyes may be provided, as will be readily understood.

Having thus described my invention, what I claim, and desire to secure by Letters Patent, is—

1. The combination, with the hopper having openings in its bottom, the bar arranged at a distance from the bottom and directly beneath the openings, and the brushes projecting downwardly from the bottom in line with the opposite sides of said bar, of the slide adapted to work in the space between the bar and the bottom of the hopper, substantially as set forth.

2. The combination of the hopper having openings in its bottom, the frame having a solid portion located directly beneath the openings in the bottom and spaces on each side of said solid portion, the brushes extending into said spaces in line with the sides of said solid portion, and the slide arranged to work between the brushes and the solid portion of said frame.

3. The combination, with the hopper and the runner, of the supplemental runner supported directly by the main runner and having a space within and on each side thereof for the passage of the grain, substantially as set forth.

4. The combination, with the hopper and the runner, of the supplemental runner adjustably connected with and supported by said main runner, substantially as set forth.

5. The combination, with the hopper and the runner, of the adjustable supplemental runner and the filling-piece, substantially as described.

6. The combination, with the hopper and the runner, of the adjustable supplemental runner and the interchangeable filling-pieces, substantially as described, and for the purpose described.

7. The combination, with the runner having side pieces projecting from its rear end, forming a space, of the supplemental runner located in said space and having its forward end provided with a projection adapted to enter one of a series of openings in the front wall between the sides of the runner, and its rear end adjustably connected with said sides, substantially as described.

8. The combination of the runner, the supplemental runner, and the filling-piece having a deflecting-board which projects beyond its bottom and extends into the supplemental runner, substantially as shown and described.

In testimony whereof I affix my signature in presence of two witnesses.

SETH BEAL.

Witnesses:
GEO. G. PIERCE,
S. L. DOGGETT.